(12) United States Patent
Mitani

(10) Patent No.: US 12,104,893 B2
(45) Date of Patent: Oct. 1, 2024

(54) THREE-DIMENSIONAL MEASUREMENT DEVICE

(71) Applicant: DENSO WAVE INCORPORATED, Chita-gun (JP)

(72) Inventor: Yusuke Mitani, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 343 days.

(21) Appl. No.: 17/764,505

(22) PCT Filed: Oct. 27, 2020

(86) PCT No.: PCT/JP2020/040263
§ 371 (c)(1),
(2) Date: Mar. 28, 2022

(87) PCT Pub. No.: WO2021/085419
PCT Pub. Date: May 6, 2021

(65) Prior Publication Data
US 2022/0349707 A1    Nov. 3, 2022

(30) Foreign Application Priority Data
Oct. 28, 2019   (JP) .................................. 2019-195349

(51) Int. Cl.
*G06F 11/30* (2006.01)
*G01B 11/25* (2006.01)
(52) U.S. Cl.
CPC .................................. *G01B 11/25* (2013.01)
(58) Field of Classification Search
CPC ..................................................... G01B 11/25
See application file for complete search history.

(56) References Cited

U.S. PATENT DOCUMENTS

2016/0227135 A1   8/2016  Matolin et al.
2017/0003121 A1*  1/2017  Brandli .................. G01B 11/25
(Continued)

FOREIGN PATENT DOCUMENTS

CN    109458928 A       3/2019
EP    2887009 A1 *  6/2015  ........... G01B 11/002
JP    3723057 B2       12/2005

OTHER PUBLICATIONS

Dec. 8, 2020 International Search Report issued in International Patent Application No. PCT/JP2020/040263.
(Continued)

*Primary Examiner* — Phuong Huynh
(74) *Attorney, Agent, or Firm* — Oliff PLC

(57) ABSTRACT

A three-dimensional measurement device measures the three-dimensional shape of an object or information indicating a shape thereof based on event data. A stripe pattern is projected from the projection unit to the object. The object is optically imaged by an imaging unit and an image based on event data is acquired. The event data, which are outputted from the image sensor, include two-dimensional point data that specifies the positions of pixels corresponding to the pixels that had luminance changes responsively to the stripe pattern projected. Based on the event data, an image of the object is obtained. The image sensor outputs positive luminance change event data when brightening luminance changes and negative luminance change event data when darkening luminance changes. The measurement unit obtains luminance information based on a time difference between output of event data of positive luminance changes and output of event data of negative luminance changes.

5 Claims, 6 Drawing Sheets

(56) References Cited

U.S. PATENT DOCUMENTS

| | | |
|---|---|---|
| 2017/0241774 A9 | 8/2017 | Brandli et al. |
| 2017/0366801 A1 | 12/2017 | Horesh |
| 2019/0360798 A1* | 11/2019 | Umemura .......... G01N 21/8806 |

OTHER PUBLICATIONS

Leroux et al.; "Event-Based Structured Light for Depth Reconstruction using Frequency Tagged Light Patterns"; University of Pittsburgh, Carnegie Mellon University, Sorbonne Universitas; Nov. 2018; pp. 1-8.

* cited by examiner

<CAPTURED IMAGE ON OPTICAL CUTTING METHOD>

LATERAL DIRECTION (FIRST DIRECTION)

<CAPTURED IMAGE>

(A)

(B)

(C)

(A)

(B)

(C)

THREE-DIMENSIONAL MEASUREMENT DEVICE

CROSS-REFERENCE TO RELATED APPLICATION

This application is based on and claims the benefit of priority from earlier Japanese Patent Applications No. 2019-195349 filed on Oct. 28, 2019 the description of which is incorporated herein by reference.

BACKGROUND

Technical Field

The present invention relates to a three-dimensional measurement device that optically measures the three-dimensional shape of an object being measured or information indicating the shape of the object, and in particular to a three-dimensional measurement device equipped with an event camera.

Related Art

Conventional three-dimensional (3D) measurement devices that optically measure the three-dimensional shape of an object being measured or information indicating the shape of an object are known, for example, as devices that use a phase shift method. According to this phase-shifting method, a plurality of phase-shifted striped pattern images (optical images) are projected. The shape of the object being measured and the information about the shape are then optically measured in the three dimensions. As a device that performs the 3D measurement using the phase shift method, the three-dimensional measurement device disclosed in Patent Document 1 below is known. In this three-dimensional measurement system, each phase of the stripes is assigned to light of different wavelengths. The stripe pattern image synthesized from the light of different wavelengths is projected onto the object to be measured. The object on which this striped pattern image is projected is imaged by a color camera. Then, each color component is extracted from the captured image and phase calculation is performed in one shot. This reduces the time required to measure the three-dimensional shape.

CITATION LIST

Patent Literatures

[PTL 1] JP 3723057 B
[PTL 2] US 2016/0227135 A

Technical Problem

By the way, an event camera disclosed in Patent Document 2 above is known as a technology to generate images of objects at a higher speed.

The event camera according to this document 2 is a luminance-value differential output camera that was developed by taking inspiration from the retinal structure of living organisms. This event camera is configured such that changes in luminance are sensed for each pixel and their coordinates, time, and polarity of luminance change are output. With this configuration, the event camera is characterized by the fact that the camera does not output pixel information without luminance changes, i.e., redundant data (event data), like conventional cameras. Therefore, advantages including reduced data communication and lighter image processing are obtained. This makes it possible to generate images of an object being measured, at a higher speed.

However, when the event data output from the event camera are used to generate an image of the object to be measured, the presence or absence of luminance changes on a pixel-by-pixel basis can be grasped from that image, but the luminance values cannot be measured directly. Hence, when implementing 3D measurement methods such as the phase shift method that uses luminance values, it is not possible to measure the 3D shape of an object to be measured.

SUMMARY

Thus it is desired to provide a device that measures the three-dimensional shape of an object being measured or information indicating the shape of an object using event data.

In order to realize the foregoing object, a first exemplary embodiment provides a three-dimensional measurement device, characterized in that
  the three-dimensional measurement device comprises
  a projection unit which optically projects a predetermined stripe pattern onto an object being measured;
  an imaging unit which captures an image by optically imaging the object onto which the predetermined stripe pattern has been projected; and
  a measurement unit which measures a three-dimensional shape of the object by applying a phase shift method to luminance information obtained from a captured image optically obtained by the imaging unit,
  wherein
  the imaging unit is provided with an image sensor, the image sensor outputting event data including data of two-dimensional points whose positions of pixels are specified corresponding to changes of luminescence when receiving the light, and is configured to generate the captured images from the event data outputted by the image sensor;
  the image sensor is configured to output the event data showing positive luminance changes when the luminance changes brightly and output the event data showing negative luminance changes when the luminance changes darkly; and
  the measurement unit is configured to obtain the luminance information showing the three-dimensional shape of the object, based on a difference, pixel by pixel, between output time of the event data showing the positive luminance changes and output time of the event data showing the negative luminance changes in the captured image.

Moreover, a second exemplary embodiment provides a three-dimensional measurement device, characterized in that
  the three-dimensional measurement device comprises
  a projection unit which optically projects a predetermined stripe pattern onto an object being measured;
  an imaging unit which captures an image by optically imaging the object onto which the predetermined stripe pattern has been projected; and
  a measurement unit which measures a three-dimensional shape of the object by applying a phase shift method to luminance information obtained from a captured image optically obtained by the imaging unit, wherein
the imaging unit is provided with an image sensor, the image sensor outputting event data including data of two-dimensional points whose positions of pixels are specified corresponding to changes of luminescence when receiving the light, and is configured to generate the captured images from the event data outputted by the image sensor;
the projection unit is configured to project the predetermined stripe pattern based on short pulses of light emitted a plurality of times within a unit time; and
the measurement unit is configured to obtain the luminance information, as information indicating the three-dimensional shape of the object, based on the number of times of output of the event data per unit time, pixel by pixel, in the captured image.

Moreover, a third exemplary embodiment provides a three-dimensional measurement device, characterized in that
the three-dimensional measurement device comprises
a projection unit which optically projects a pattern on a light cutting method onto an object being measured;
an imaging unit which captures an image by optically imaging the object onto which the pattern has been projected; and
a measurement unit which measures a three-dimensional shape of the object based on a captured image optically obtained by the imaging unit,
wherein
the projection unit is configured to project the pattern for the light cutting method such that luminescence changes at a certain rate in a first direction and the luminescence does not change in a second direction perpendicular to the first direction;
the imaging unit is provided with an image sensor, the image sensor outputting event data including data of two-dimensional points whose positions of pixels are specified corresponding to changes of luminescence when receiving the light, and is configured to generate the captured images from the event data outputted by the image sensor; and
the measurement unit is configured to obtain a three-dimensional shape of the object based on the light cutting method and positions of the event data outputted in a same time zone in the captured images.

The reference numbers of the above brackets indicate the correspondence with the specific means described in the embodiments described below.

The three-dimensional measurement device according to the first exemplary example includes an imaging unit that captures images of an object being imaged on which a predetermined stripe pattern is projected from a projection unit. This imaging unit is provided with an image sensor, which outputs event data including two-dimensional point data that identifies the location of a pixel, corresponding to the pixel with a change in luminance when light is received. A captured image is generated from the event data output from the image sensor. The image sensor has the following configurations. In other words, the image sensor outputs event data of positive luminance changes when the luminance changes indicate a brightening event. On the other hand, the image sensor outputs event data of negative luminance changes when the luminance changes indicate a darkening event. The measurement unit obtains luminance information based on the time differences between the output of the event data of positive luminance changes and the output of the event data of negative luminance changes, every pixel unit in the captured image.

The projection unit projects a predetermined stripe pattern for a phase shift method. During this projection, for example, an R color emitting state, a G color emitting state, and a B color emitting state are repeated at a predetermined cycle in pixel units. In addition, each flash duration is adjusted individually. On the other hand, in the imaging unit, event data is output as follows. In other words, for each pixel in the captured image, when a luminance change that becomes brighter by receiving light occurs, the event data of positive luminance change is output. When the luminance changes to darken due to the disappearance of the light, the event data of negative luminance change is output. As a result, at a certain pixel level, for example, when changing from the R color emission state to the G color emission state, event data for positive luminance change is output at the timing of the start of R color emission, event data for negative luminance change is output at the timing of the end of R color emission, and furthermore, event data for positive luminance change is output at the timing of the start of G color emission. The longer the time between the start of R color emission and the end of R color emission, the brighter the R colors become. Therefore, it is possible to obtain luminance information (luminance values) for R colors according to the time from the start of R color emission to the end of R color emission. As a result, the above luminance information can be obtained based on the time difference between the output of the event data of positive luminance change and the output of the event data of negative luminance change for each pixel in the captured image. Based on the obtained luminance information, the three-dimensional shape of the object can be measured using the phase shift method. In other words, the three-dimensional shape of the object can be measured using the event data.

In the three-dimensional measurement device according to a second exemplary example, an imaging unit is provided to image an object being measured on which a predetermined stripe pattern is projected from the projection unit. This imaging unit is equipped with an image sensor that outputs event data including two-dimensional point data that identifies the position of a pixel at which the pixel is subject to changes in luminance when the light is received. A captured image is generated from the event data output from this image sensor. The projection unit projects the above-mentioned predetermined stripe pattern using a short pulse light emission that is emitted multiple times within a unit time. The measurement unit obtains luminance information based on the number of times event data is output per unit time for each pixel in the captured image.

In the projection unit, the foregoing R-color, G-color, and B-color emission states can be realized by short pulse light emission, respectively, for the purpose of reducing power consumption. In this case, the greater the number of short pulses of light emission per unit time, which is ensured for each emission state, the brighter the color of the light emission. As a result, event data of positive luminance changes and event data of negative luminance changes are outputted pixel by pixel in response to single short pulse emission in the image sensor. This means that luminance information (luminance values) for that luminous color can be obtained based on the number of short pulse light emissions per unit time, i.e., the number of times event data is outputted per unit time. Therefore, the three-dimensional shape of an object can be measured by the phase shift method (technique) based on the luminance information obtained based on the number of times the event data is outputted per unit time. In other words, the event data can be used to measure the three-dimensional shape of the object being measured.

In the three-dimensional measurement device for the second exemplary example, the imaging unit is provided to image an object being measured on which the pattern for the optical cutting method (technique) is projected from the projection unit. This imaging section is equipped with an image sensor that outputs event data, including two-dimensional point data that identifies the positions of the pixels, which correspond to the pixels with changes in luminance when light is received. In the imaging unit, a captured image is generated based also on the event data outputted from the image sensor. The above pattern for the optical cutting method is projected from the projection unit so that the luminance changes at a constant rate in the first direction and does not change in the second direction orthogonal to the first direction. The measurement unit measures the three-dimensional shape of an object to be measured, based on the positions of the event data outputted at the same time in the captured image of the object.

In the projection unit, the R-color, G-color, and B-color emission states are repeated in a predetermined cycle. In this repetitive state, for example, when emitting R color, the longer the time between the timing of the start of R color emission and the timing of the end of R color emission, the brighter the R color becomes. In the image sensor that receives light according to this projection state, event data of positive luminance changes are outputted at the timing of the start of R color emission within the unit time secured for each emission state.

In addition, event data for negative luminance changes are outputted at the timing of the end of R color emission. For this reason, for example, a pattern for the light cutting method (technique) is used in which the luminance of the R color changes in the lateral direction (the first direction) so that the luminance increases at a constant rate from the left to the right, and at the same time, the luminance of the R color is projected so that the luminance does not change in the vertical direction (the second direction). When the imaging unit irradiates light based only on this pattern for the light cutting method, the event data group of negative luminance changes outputted in the same time period is in the form of a line in the vertical direction, and the event data group is captured in such a way that the line moves from the left side to the right side within the above unit time. This group of event data with line-shaped movement can be used as a line-shaped laser beam used in the optical cutting method. Therefore, the three-dimensional shape of an object can be measured by the optical cutting method, based on the positions of the event data outputted during the same period of time within the unit time secured for each emission state. In other words, the event data can be used to measure the three-dimensional shape of the object.

More specifically, the measurement unit functions as a judgment unit to determine whether or not a relative distance change of the measurement object to the imaging unit is more than a predetermined distance based on the difference between the previous measurement result and the past measurement result. When the above relative distance change is determined to be less than the above predetermined distance by the measurement unit, the projection unit projects a predetermined stripe pattern using a short pulse light emission, and the measurement unit obtains luminance information based on the number of times event data is outputted per the unit time at pixel units in the captured image. On the other hand, when the measurement unit determines that the above relative distance change is greater than the above predetermined distance, the projection unit projects a predetermined stripe pattern using a single pulse light emission, and the measurement unit obtains luminance information based on the time difference between the output of event data of positive luminance change and the output of event data of negative luminance change at pixel units in the captured image.

This allows the two configurations for obtaining luminance information to be switched between two configurations from one to the other according to changes in the relative distance of the object to the imaging unit. In other words, one configuration is to obtain luminance information based on the number of times event data is outputted per the unit time. The other configuration is to obtain luminance information based on the time difference between the output of event data of positive luminance changes and the output of event data of negative luminance changes at each pixel in the captured image.

In yet another example, the measurement unit functions as a judgment unit to determine whether or not the relative distance change of the object to be measured relative to the imaging unit is more than a predetermined distance, based on the difference between the previous measurement result and the past measurement result. This measurement unit may determine that the above relative distance change is greater than the above predetermined distance. In this case, the projection unit projects a light pattern for the optical cutting method, and the measurement unit measures the three-dimensional shape of the measurement object by the optical cutting method based on the position of the event data output at the same time in the captured image of the measurement object. On the other hand, the measurement unit may determine that the above relative distance change is less than the above predetermined distance. In this case, the projection unit projects a predetermined stripe pattern of light for the phase shift method, and the measurement unit measures a three-dimensional shape of the object by the phase shift method using the luminance information obtained based on the time difference between the output of the event data of positive luminance change and the output of the event data of negative luminance changes at respective pixels in the captured image.

This allows the two measurement configurations to be switched between each other according to changes in the relative distance of the measurement object to the imaging unit. One of the measurement configurations is to measure a three-dimensional shape of the object based on the positions of the event data outputted at the same time in the captured image using the optical cutting method. Another measurement configuration is to measure a three-dimensional shape of the object by the phase shift method, using the luminance information obtained based on the time difference between the output of the event data of positive luminance changes and the output of the event data of negative luminance changes in respective pixels in the captured image.

BRIEF DESCRIPTION OF THE DRAWINGS

FIG. 2 is an illustration, in which FIG. 2(A) illustrates R-color, G-color, and B-color emission states at a certain pixel level when projecting a predetermined stripe pattern, and FIG. 2(B) is an illustration of the R-color, G-color, and B-color emission states at different pixel levels from those of FIG. 2(A).

FIG. 5 is an illustration of captured images generated by using event data output with only the pattern for the optical cutting method projected in FIG. 4, wherein FIG. 5(A) shows an imaging state provided 10 μs after the start of the projection of the pattern for the optical cutting method, FIG. 5(B) shows an imaging state provided 50 μs later, and FIG. 5(C) shows an imaging state provided 100 μs later.

FIG. 6 is an illustration of captured images generated by using event data output when the pattern for the optical cutting method in FIG. 4 is projected onto a circular measurement object, wherein FIG. 6(A) shows the imaging state provided 10 μs after the start of the projection of the pattern for the optical cutting method, FIG. 6(B) shows an imaging state provided 50 μs later, and FIG. 6(C) shows an imaging state provided 100 μs later.

DESCRIPTION OF THE EMBODIMENTS

First Embodiment

A first embodiment of the present invention, embodying a three-dimensional measurement device, will now be described below with reference to the accompanying drawings. This device measures the three-dimensional shape of an object to be measured or information indicating the shape of the object.

Figure 1:
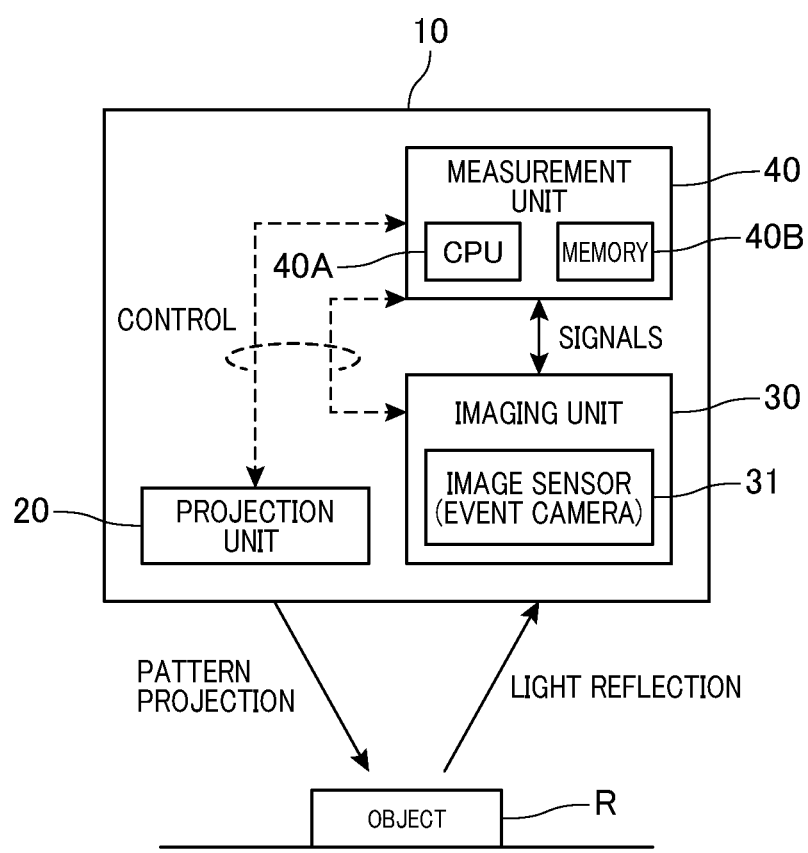
FIG. 1 is a block diagram of a schematic configuration outlining a three-dimensional measurement device according to a first embodiment.

A three-dimensional measurement device 10 is provided as a device for optically measuring the three-dimensional shape of an object R being measured. As shown in FIG. 1, the three-dimensional measurement device 10 is equipped with an imaging unit 30 and a measurement unit 40 in addition to a projection unit 20 that projects a predetermined stripe pattern (light pattern) for a phase shift method (technique) onto the object R being measured. The imaging unit 30 is configured to optically capture (image) the object on which the predetermined stripe pattern is projected and obtain an optical image (captured image). The measurement unit 40 is configured to measure or restore the three-dimensional shape of the object R from the captured image thereof. The projection unit, the imaging unit, and the measurement unit are each provided as separate units. The three-dimensional measurement device 10 configured in this way is assembled on the hand of a robot, for example. In this way, the measurement device 10 measures the three-dimensional shape of a workpiece or other objects R, which will be moved relative to the hand at a high speed.

The projection unit 20 is, in terms of the configuration thereof, a DLP (Digital Light Processing) projector. In other words, the projection unit 20 projects the predetermined stripe pattern of light by reflecting the light from the light source with a DMD (Digital Mirror Device). DMD consists of an array of minute mirrors corresponding to each pixel of the image projected on the screen. Therefore, by changing the angle of each mirror, the light emitted to the screen is configured to be turned on and off in microseconds. Consequently, the gradation of the reflected light can be varied according to the ratio of the time each mirror is turned on to the time it is turned off. This makes it possible to display gradations based on the image data of the projected image. In particular, color R (red), color G (green), and color B (blue) are available for the light incident on the DMD. The color R state, in which the color R is reflected by the mirror, the color G state, in which the color G is reflected by the mirror, and the color B state, in which the color B is reflected by the mirror, are repeated in a short, predetermined cycle. Therefore, color images can be projected by adjusting the emission time of each of the color lights. In such a configuration, the longer the emission time of a single puke emission, which is emitted once in a unit time secured for each emission state, the brighter the color of the emission.

In this embodiment, a sine wave pattern identified from luminance values I(x, y, n) based on the following equation (1) is employed as the predetermined stripe pattern (optical pattern) for the phase shift method (technique) described above. That is, when the number of phase shifts is denoted as N, the luminance values I(x, y, n) of the N phase-shifted grid images (stripe images) are expressed by equation (1).

$$I(x,y,n)=a(x,y)\cos\{\theta(x,y)+2\pi n/N\} \pm b(x,y) \quad (1)$$

In this equation, the point (x, y) indicates each point in the grid image, a(x, y) indicates the luminance amplitude, b(x, y) indicates the background luminance, and θ(x, y) indicates the phase of the n=0 grid. The distance z to the point (x, y) is measured according to θ(x, y), which is calculated from the luminance values I(x, y, n) of the N grid images.

Specifically, this system is based on the premise that three grid images are obtained from the captured images for one cycle by the color R, color G, and color B emission states described above. Under this premise, the luminance values I(x, y, 0) in the color R emission state, I(x, y, 1) in the color G emission state, and I(x, y, 2) in the color B emission state are obtained from the captured image as N=3. For this reason, the predetermined stripe pattern (optical pattern) for the phase shift method in this system is composed of a sine wave pattern composed only of the color R, a sine wave pattern composed only of the color G, and a sine wave pattern composed only of the color B, so that their phases are mutually shifted by 2π/3.

The imaging unit 30 is an imaging device equipped with an image sensor 30 that functions as an event-based camera, as well as circuitry to drive the image sensor 30, data output circuitry, and threshold setting circuitry (not shown). The image sensor 30 functions as an event-based camera. Therefore, the imaging unit 30 is configured by its event-based camera to be able to generate an image from the event data outputted from the imaging unit 30. In other words, the image sensor 30 outputs event data (specifically, two-dimensional point data, time, and polarities of luminance changes) including two-dimensional point data that identifies the position of each pixel that undergoes luminance changes when the light was emitted. The imaging device 30 that forms this event-based camera is known, for example, from U.S. Patent Application Publication No. 2016/0227135.

Therefore, the event data corresponding to pixel-by-pixel luminance changes in the captured image is outputted from the imaging unit 30. In other words, when the luminance changes that becomes brighter in response to the light reception occurs at a pixel, the event data of the positive luminance change, i.e., the luminance changes to the positive, is outputted at the pixel. When luminance changes occur at a pixel that darkens as its light disappears, event data for the negative luminance change, i.e., the luminance changes to the negative, is outputted at the pixel. Two-dimensional point data consisting of multiple event data outputted within a certain period of time are plotted on a predetermined plane as points, respectively. This makes it possible to generate image data of the object. The imaging unit 30 is configured to output the image data or event data (composed of two-dimensional point data, time, and polarities of luminance changes) thus generated to the measurement unit 40.

The measurement unit 40 operates based on captured images of the object R obtained by the imaging unit 30 in the state in which the predetermined stripe pattern described above is projected from the projection unit 20. The measurement unit 40 is configured to measure a three-dimensional shape of the object R based on its captured images, using the phase shift method (technique). Specifically, the measurement unit 40 obtains luminance values I(x,y,0), I(x,y,1), and I(x,y,2) at point (x,y) in the above captured image. Furthermore, the measurement unit 40 calculates θ(x, y) based on those luminance values and measures the distance z to the point (x, y) according to this calculated θ(x, y).

The measurement unit 40 is typically configured as a microcomputer with a CPU 40A and various memories 40B. This CPU 40A sequentially executes each step of a program for 3D measurement stored in advance in memory 40B. This provides information on the three-dimensional shape of the object R based on such three-dimensional measurements.

On the other hand, the measurement unit 40, or the CPU 40A, also work with the projection unit 20 and the imaging unit 30 to perform such 3D measurements. The program for this cooperative control is also stored in advance in a separate area of the memory 40B. Thus, the CPU 40A executes its control program. As a result, the CPU 40A is responsible for controlling the drive and projection timing of the projection unit 30, as well as the drive control of the imaging unit and the imaging unit 30. That is, the CPU 40A can be responsible for controlling the reading timing of event data outputted from an image sensor 31 (see the dotted arrow in FIG. 1).

Therefore, the measurement unit 40 functions as the measurement means for three-dimensional measurement and as the control means for the various controls described above.

Thus, in the present embodiment, the control function (control means, control unit) of the three-dimensional measurement device 10 is configured in such a way that the computer configuration of the measurement unit 40 is concurrently responsible for the control function. Of course, this control function (control means, control unit) may be provided by a dedicated control unit that is separate from the measurement unit 40.

The three-dimensional measurement process performed by the measurement unit 40 when measuring the three-dimensional shape of the measurement object R using the phase shift method is described in detail below.

In the present embodiment, the imaging unit 30 employs an event-based camera. This event-based camera is the main part of the imaging unit 30 for accurately capturing images of the object R that is moving relative to the camera at high speed. In this configuration, event data corresponding to pixels with luminance changes are outputted. Since that event data does not contain luminance values, the luminance values (I(x,y,0), I(x,y,1), and I(x,y,2)) needed for the phase shift method cannot be obtained directly.

Therefore, in this embodiment, luminance values (luminance information) are obtained based on a time difference between the output of event data indicating positive luminance changes (luminance polarity changes to the positive) and the output of event data indicating negative luminance changes (luminance polarity changes to the negative) at each pixel in the captured image. This luminance value corresponds to information indicating a three-dimensional shape of the object R.

Figure 2:
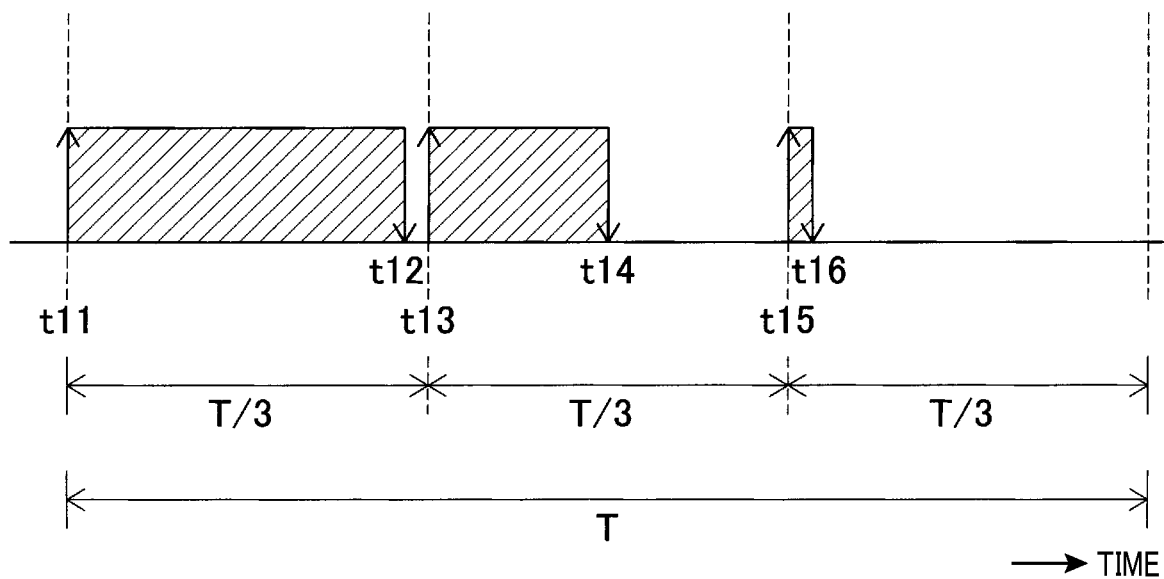
Figure 2:
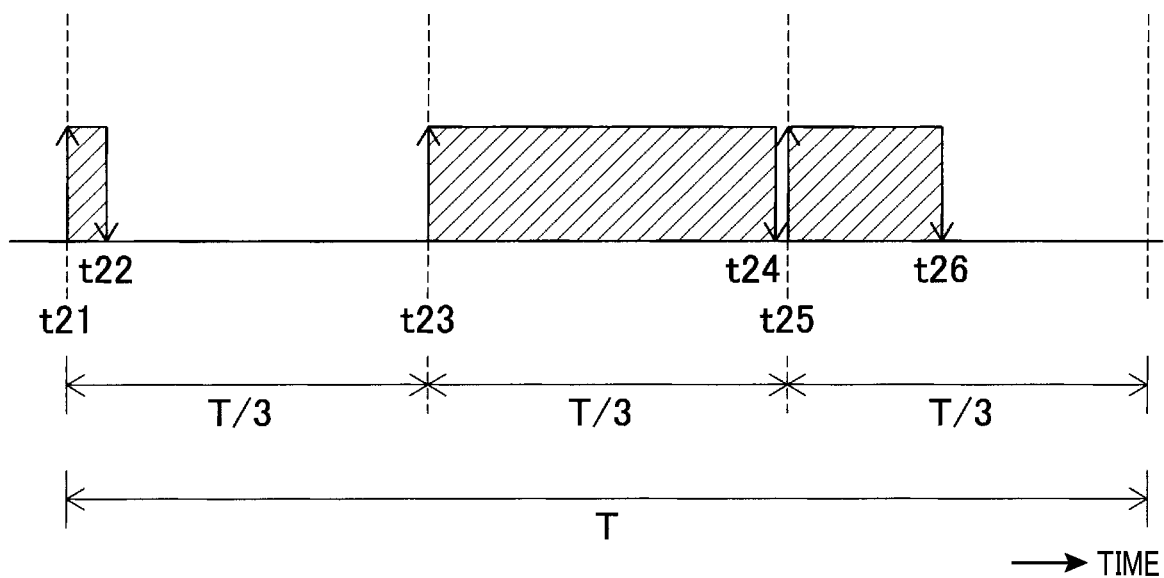

For a more detailed explanation, for example, assume that in a certain pixel, the R-color emitting state, G-color emitting state, and B-color emitting state are repeated at a predetermined period T, as illustrated in FIG. 2(A). In FIGS. 2(A) and 2(B), the output of event data indicating positive luminance changes is indicated by an upward arrow, and the output of event data indicating negative luminance changes is indicated by a downward arrow.

In such a light-emitting state, event data indicating positive luminance changes is outputted at the timing of the start of R-color emission (see t11 in FIG. 2(A)), and event data indicating negative luminance changes is outputted at the timing of the end of R-color emission (see t12 in FIG. 2(A)). Thereafter, event data indicating positive luminance changes is outputted at the timing of the start of G-color emission (see t13 in FIG. 2(A)), and event data indicating negative luminance changes is outputted at the timing of the end of G-color emission (see t14 in FIG. 2(A)). After that, event data indicating positive luminance changes is outputted at the timing of the start of B-color emission (see t15 in FIG. 2(A)), and event data indicating negative luminance changes is outputted at the timing of the end of B-color emission (see t16 in FIG. 2(A)).

For example, in another pixel different from the pixel described in FIG. 2(A), event data indicating positive luminance changes is outputted at the timing of the start of R-color emission (see t21 in FIG. 2(B)) and event data indicating negative luminance changes at the timing of the end of R-color emission (see t22 in FIG. 2(B)), as exemplified in FIG. 2(B). Thereafter, event data indicating positive luminance changes is outputted at the timing of the start of G-color emission (see t23 in FIG. 2(B)), and event data indicating negative luminance changes is outputted at the timing of the end of G-color emission (see t24 in FIG. 2(B)). Thereafter, event data of positive luminance changes indicating the timing of the start of B color emission is outputted (see t25 in FIG. 2(B)), and event data of negative luminance changes indicating the timing of the end of B color emission is outputted (see t26 in FIG. 2(B)).

Here, the longer the time between the timing of the start of R-color emission and the timing of the end of R-color emission, the brighter the R-color becomes. Therefore, the R-color luminance value can be obtained according to the time from the timing of the start of R-color emission to the timing of the end of R-color emission. Similarly, the luminance value of G-color can be obtained according to the time from the timing of the start of G-color emission to the timing of the end of G-color emission. Furthermore, the luminance value of B-color can be obtained according to the time from the timing of the start of B-color emission to the timing of the end of B-color emission.

Therefore, the measurement unit 40 can obtain luminance values (luminance information) based on the time difference between the output of event data indicating positive luminance changes and the output of event data indicating negative luminance changes at each pixel in the captured image. This luminance value (luminance information) is information that indicates a three-dimensional shape of the object R.

In the example in FIG. 2(A), the measurement unit 40 can determine the luminance value I (x, y, 0) in the R-color emitting state based on t12-t11, the time difference between the output of event data indicating positive luminance changes and the output of event data indicating negative luminance changes with respect to the R-color emitting state. In the same way, based on the time differences t14-t13 and t16-t15, the luminance values I(x,y,1) in the G-color emitting state and I(x,y,2) in the B-color emitting state can be obtained.

In other words, the measurement unit 40 can obtain luminance information as information indicating a three-dimensional shape of the object based on the time difference between the output of event data indicating a positive luminance change and the output of event data indicating a negative luminance change, at each pixel in the captured image.

By applying the phase shift method to each luminance value obtained in this way, a three-dimensional shape of the object can be measured. In other words, event data can be used to measure the three-dimensional shape of the object. The above predetermined stripe pattern may be projected using short pulse emission that is emitted multiple times within a unit time, as described below. In this case, the luminance value may be determined based on the sum of the time differences between the output of event data indicating a positive luminance change and the output of event data indicating a negative luminance change, which occurs repeatedly within the unit time.

In particular, event data used for three-dimensional measurements are outputted in response to luminance changes. Therefore, it is possible to accurately measure even objects with large luminance differences from the background (e.g., black objects on a white desk surface), which the usual phase shift method with no use of the event data cannot be treated well.

In addition, color mixing may occur due to the overlap of color bands between the object and the background, which is a weakness of the RGB phase shift method using a color camera. However, the example of this embodiment allows accurate measurement even in such cases.

Second Embodiment

Next, a three-dimensional measurement device for this second embodiment will now be described with reference to the drawings.

In this second embodiment, the projection unit 20 projects the aforementioned predetermined stripe pattern of light using a short pulse emission (the width (time width) of one pulse is short) that emits multiple times within a unit time. This is the main difference from the first embodiment above. Therefore, the same symbols are attached to the constituent parts that are substantially the same as those in the first embodiment, and their explanations are omitted.

This embodiment also has the objective of including power consumption reduction in the projection unit 20. Therefore, the R-color, G-color, and B-color emitting states described above are realized by the short pulse emission, respectively. In this configuration, the more the number of short pulse emissions per unit time (T/3) reserved for each emission state, the brighter its emission color becomes.

Figure 3:
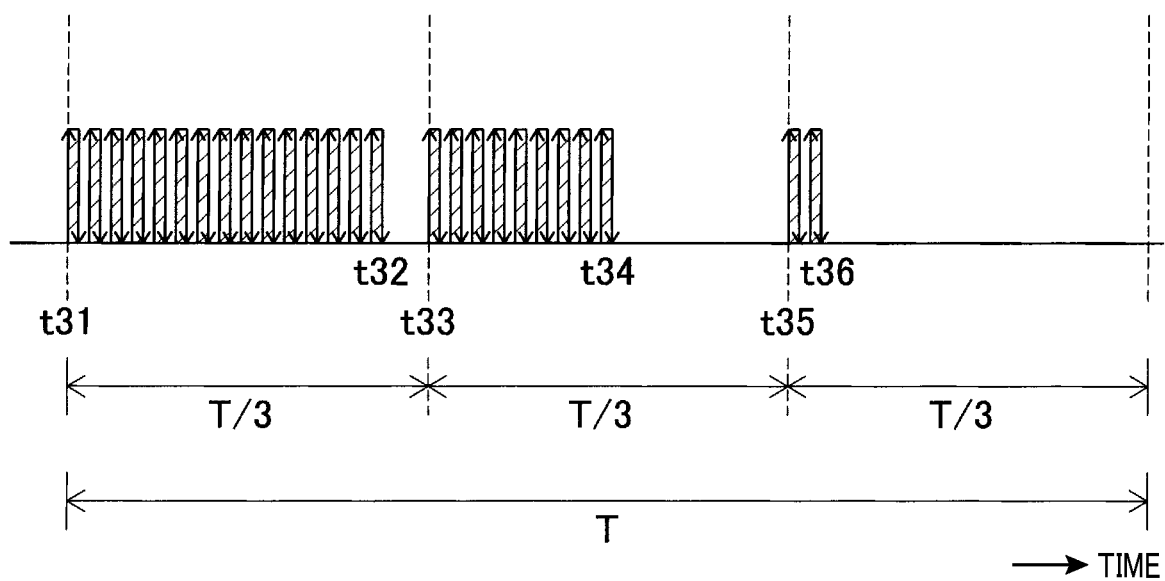
FIG. 3 is an illustration of the R-color, G-color, and B-color emission states when projecting a predetermined stripe pattern using short-pulse light emission, according to a second embodiment.

Then, at each pixel of the image sensor 31, event data indicating a positive luminance change and event data indicating a negative luminance change are outputted in response to one short pulse emission, as shown in FIG. 3. Therefore, the luminance value of the emission color can be obtained based on the number of short pulse emissions per unit time, i.e., the number of outputs of event data per unit time.

In the example shown in FIG. 3, the luminance value I(x,y,0) in the R-color emitting state can be obtained based on the number of outputs of event data per unit time (the number of outputs between t31 and t32). In the same way, the luminance value I(x, y, 1) in the G-color emitting state can be obtained based on the number of outputs of event data per unit time (between t33 and t34) described above in the G-color emitting state. Also, the luminance value I(x,y,2) in the B-color emitting state can be obtained based on the number of outputs of event data per unit time (the number of outputs between t35 and t36) in the B-color emitting state.

In other words, the measurement unit 40 can obtain luminance information as information indicating a three-dimensional shape of the object, based on the number of outputs per unit time of event data at each pixel in the captured image.

By applying each luminance value obtained in this way to the phase shift method, the three-dimensional shapes of the object can be measured. In other words, even if the projection unit 20 is configured to project the above predetermined stripe pattern using the short pulse emission, the event data can be used to measure the three-dimensional shapes of the object.

The characteristic configuration of this second embodiment (i.e., configuration to obtain luminance information based on the number of outputs of event data per unit time in response to changes in the relative distance of the object R to the imaging unit 30) and the characteristic configuration of the first embodiment above (i.e., the configuration for obtaining luminance information based on the time difference between the output of event data indicating a positive luminance change and the output of event data indicating a negative luminance change at each pixel in the captured image) may be switched from one the other.

Specifically, the projection unit 20 is configured to switch between a state in which a predetermined stripe pattern of light is projected using a short pulse emission that is emitted multiple times within a unit time and a state in which a predetermined stripe pattern is projected using a single pulse emission that is emitted once within a unit time. The measurement unit 40 functions as a judgment unit to determine whether or not a relative distance change of the object R to the imaging unit 30 is greater than or equal to the first predetermined distance based on the difference between the previous measurement result and the previous past measurement result (e.g., the previous two measurement results).

If the above relative distance change is determined by the measurement unit 40 to be less than the above first predetermined distance, the projection unit 20 and the measurement unit 40 operate as follows. In other words, the projection unit 20 projects a predetermined stripe pattern using the short pulse emission. The measurement unit 40 obtains luminance information based on the number of outputs per unit time of event data at each pixel in the captured image. On the other hand, if the above relative distance change is determined by the measurement unit 40 to be greater than the above first predetermined distance, the projection unit 20 and measurement unit 40 operate as follows. In other words, the projection unit 20 projects a predetermined stripe pattern using the single-pulse emission. Furthermore, the measurement unit 40 obtains luminance information based on the time difference between the output of event data indicating a positive luminance change and the output of event data indicating a negative luminance change at each pixel in the captured image. This luminance information is information that indicates a three-dimensional shape of the object R.

Therefore, it can also be used to measure three-dimensional shapes of the object R with a relatively small relative distance change, i.e., the object R with relatively small motions. For this measurement, luminance information is obtained based on the number of times the event data is outputted per unit time. This improves the robustness of the measurement with respect to factors including the color of the object R and the effect of ambient light.

On the other hand, it can also measure three-dimensional shapes of the object R with relatively large relative distance changes, i.e., with relatively large motions. In the case of such measurement, luminance information is obtained based on the time difference between the output of event data indicating a positive luminance change and the output of event data indicating a negative luminance change. Therefore, luminance information can be obtained more quickly than when luminance information is obtained based on the number of times event data is outputted as described above.

Third Embodiment

Next, the three-dimensional measurement device for a third embodiment will now be described with reference to the drawings. The third embodiment differs from the first embodiment described above mainly in that the third embodiment uses an optical cutting method (technique) to measure three-dimensional shapes of an object being measured. Therefore, the same symbols are attached to the constituent parts that are substantially the same as those in the first embodiment, and their descriptions are omitted.

In this embodiment, the projection unit 20 is configured to project a light pattern for the optical cutting method toward an object R being measured, in order to measure a three-dimensional shape of the object using the optical cutting method. The pattern for the light cutting method in this embodiment is projected in the R, G, and B-colors so that luminance of the colors varies from the left to right at a constant rate in the first direction and does not vary in the second direction, which is orthogonal to the first direction.

In addition, the measurement unit 40 is configured to measure a three-dimensional shape of the object using the optical cutting method, based on the positions of the event data outputted during the same time period in the captured image.

The following is a description of the optical cutting method using patterns for the optical cutting method projected as described above.

In the projection unit 20, the R-color emitting state, G-color emitting state, and B-color emitting state are repeated in a predetermined cycle. In this repetitive state, for example, for R-color, the longer the time between the timing of the start of R-color emission and the timing of the end of R-color emission, the brighter the R-color becomes. The image sensor 31 of the imaging unit 30 receives light according to its projected state. Therefore, event data indicating a positive luminance change is outputted from the image sensor 31 at the timing of the start of R-color emission, and event data indicating a negative luminance change is outputted at the timing of the end of R-color emission within the unit time reserved for each emission state.

Figure 4:
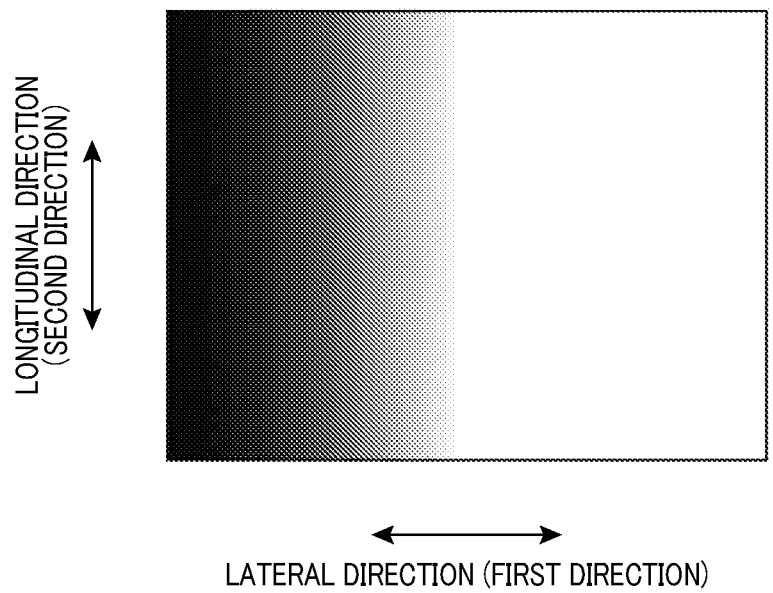
FIG. 4 is an illustration of the pattern for an optical cutting method for a third embodiment.

An example is assumed, as shown in FIG. 4. This assumption shows an example of a captured image in which only the pattern for the optical cutting method is captured (imaged) by the imaging unit 30. According to this pattern, the luminance of color R is projected so that the luminance changes from the left side to the right side in the lateral direction (right-left direction, i.e., a first direction) to increase at a constant rate, but does not change in the vertical direction (up-down direction, i.e., a second direction).

In such a case shown in FIG. 4, according to the image captured by the imaging unit 30, the event data group of negative luminance changes outputted in the same time period within the foregoing unit time becomes a line in the vertical direction. Furthermore, the event data group is captured moving animatedly from the left side to the right side within the above unit time. The closer to the left end of the above pattern, the darker it becomes. Therefore, the timing of the end of R color emission becomes earlier as it approaches the left end and brighter as it approaches the right end of the above pattern. Moreover, the timing of the end of R color emission becomes later as one approaches the right end of the pattern. In the vertical direction, the timing of the end of R-color emission is almost the same in the vertical direction.

Figure 5:
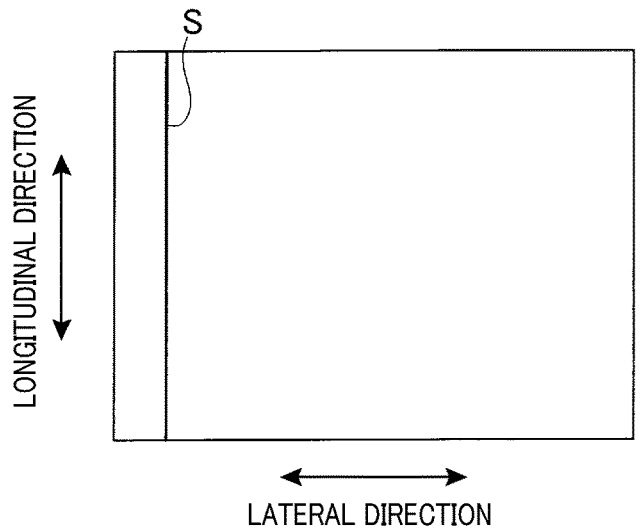
Figure 5:
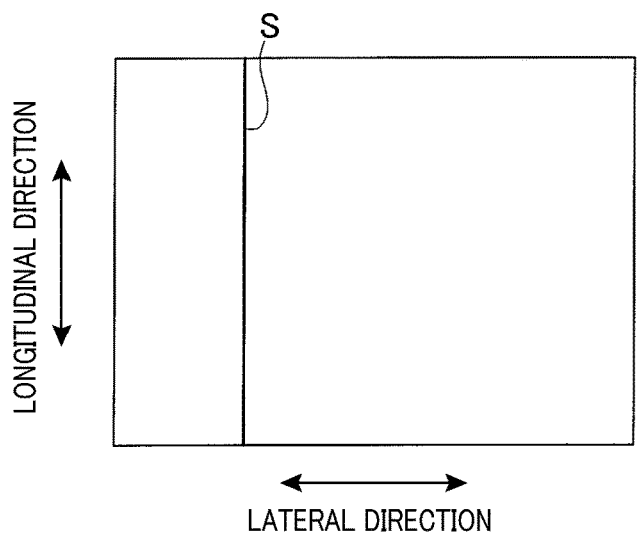
Figure 5:
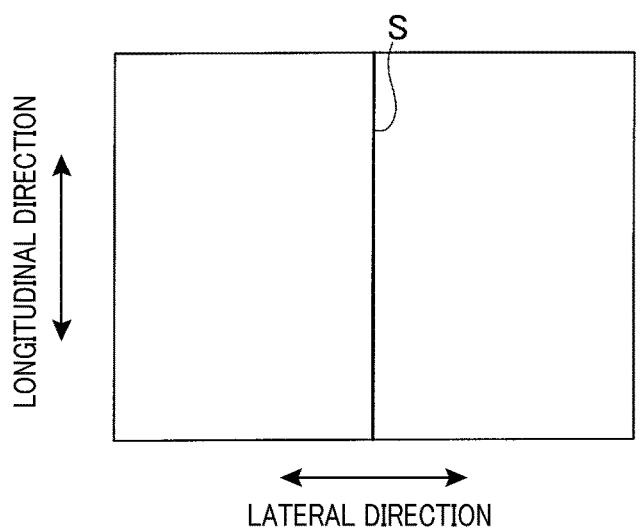

Specifically, for example, the projection of the foregoing pattern for the optical cutting method is started by the projection unit 20. Ten μs after this start, the pattern is imaged by the imaging unit 30. In this imaging state, as shown in FIG. 5(A), the event data group S becomes a line in the vertical direction near the left edge of the above pattern. Then, for example, after 50 μs, the line-shaped event data group S moves to the right, as shown in FIG. 5(B). Furthermore, after 100 μs, the line-shaped event data group S moves further to the right, as shown in FIG. 5(C).

Figure 6:
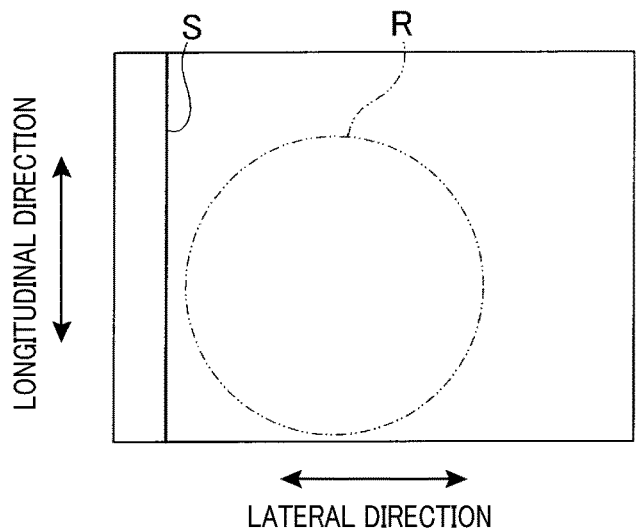
Figure 6:
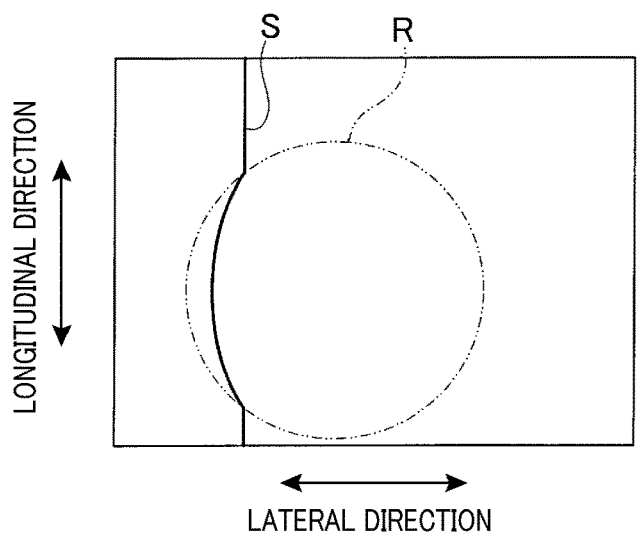
Figure 6:
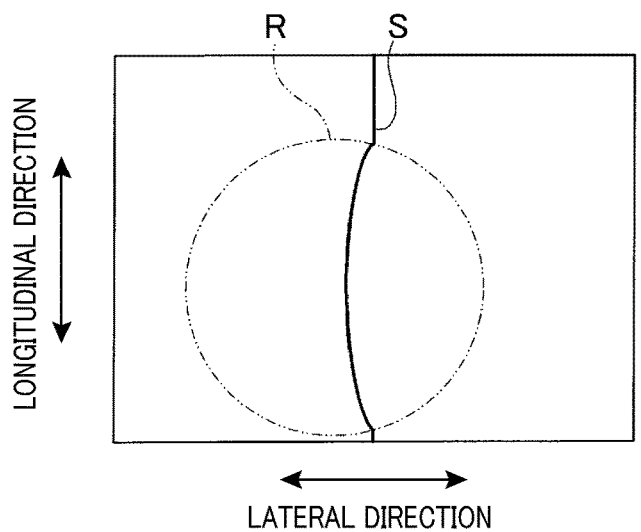

As the line projection moves in this manner, a group of event data is captured. This event data group can be used as a line-shaped laser beam used under the optical cutting method. Specifically, for example, the foregoing pattern for the optical cutting method is projected from the projection unit 20 onto the circular-shaped object R. In this case, 10 μs after the projection is started, and as shown in FIG. 6(A), the event data group S has not yet been projected onto the object R. In this state, the event data group S is imaged to be a line in the vertical direction. Then, for example, after 50 μs, as shown in FIG. 6(B), the event data group S reaches the object R being measured. At this arrival, the event data group S is captured so that the sequence of the event data groups S changes according to the shape of the object R. After that, as shown in FIG. 6(C), the event data group S is captured so that the sequence of the event data groups S changes according to the shape of the object R.

Therefore, within the unit time secured for each light emission state, the three-dimensional shape of the object to be measured can be measured by the measurement unit 40 under the optical cutting method, based on the position of the event data outputted during the same time period. In other words, the three-dimensional shape of the object can be measured using the event data.

The pattern for the optical cutting method is not limited to the foregoing projection mode. That is, the pattern is not limited to being projected in such a way that the luminance of color R increases at a constant rate from the left to right in the lateral direction and that the luminance of color R does not change in the vertical direction. For example, the pattern may be projected so that the luminance of the G (B) color increases at a constant rate from the left to right in the lateral direction and the luminance of the G (B) color does not change in the vertical direction.

In addition, the pattern for the light cutting method is not limited to the mode in which the luminance of the R (G, B) color changes in the left to right direction so that the luminance of the R (G, B) color increases at a constant rate from the left to the right and is projected in the vertical direction so that the luminance of the R (G, B) color does not change. Such a pattern can be in the form of a projection in which the luminance changes at a constant rate in the first direction and does not change in the second direction orthogonal to the first direction in any of the R, G, or B color.

Depending on changes in the relative distance of the object R to the imaging unit 30, the configuration for measuring the three-dimensional shape of the object using the optical cutting method (the characteristic configuration of this third embodiment) and the configuration for measuring the three-dimensional shape of the object using the phase shift method (the characteristic configuration of the first embodiment above) may be switched from one the other.

Specifically, the projection unit 20 is configured to mutually switch between a state in which the projection unit 20 projects a pattern for the optical cutting method and a state in which the projection unit 20 projects a predetermined stripe pattern for the phase shift method. The measurement unit 40 also functions as a judgment unit to determine whether a relative distance change of the object R to the imaging unit 30 is greater than or equal to a second predetermined distance, based on a difference between the previous measurement result and a more past measurement result (e.g., the previous two measurement results).

If the relative distance change is determined by the measurement unit 40 to be greater than the above second predetermined distance, the projection unit 20 and measurement unit 40 perform the following processing. In other words, the projection unit 20 projects a pattern for the optical cutting method, and measurement unit 40 measures a three-dimension& shape of an object R, based on the position of event data outputted during the same time period in the image taken of the object R by the optical cutting method. On the other hand, if the relative distance change is determined by the measurement unit 40 to be less than the second predetermined distance, the projection unit 20 projects a predetermined stripe pattern using the single-pulse emission. Furthermore, the measurement unit 40 measures a three-dimensional shape of the object to be measured by the phase shift method based on the luminance information obtained from the time difference between the output of event data of positive luminance changes and the output of even data of negative luminance changes in each pixel in the captured image.

This also allows measurement of the 3D shape of an object R with a relatively large relative distance change, i.e., an object R with a relatively large motion. In this measurement, the three-dimensional shape of the object R is measured by the optical cutting method based on the position of the event data output during the same time period. Therefore, the 3D shape can be measured more quickly than when using the phase shift method. In contrast, it can also be used to measure the 3D shape of an object R with relatively small relative distance change, i.e., an object R with relatively small motion. For this measurement, the luminance information obtained based on the time difference between the output of the event data of positive luminance changes and the output of the event data of negative luminance changes is used. The three-dimensional shape of the object R is measured by the phase shift method, which allows the three-dimensional shape to be measured with higher precision than when the optical cutting method is used.

The invention is not limited to the above embodiments, but may be embodied, for example, as follows.

(1) Three-dimensional measurement device 10 is not limited to the measurement with which the device assembled on the robot hand to measure the 3D shape of a relative moving object. For example, the 3D measurement device 10 may be used in a fixed state to measure the 3D shape of an object moving on a conveyor line.

(2) The three-dimensional measurement device 10 may be configured such that the projection unit 20 and the imaging unit 30 are separated from the measurement unit 40. The measurement unit 40 may be configured as an information processing terminal capable of wireless or wired communication with the projection unit 20 and the imaging unit 30.

(3) The invention may be applied to a three-dimensional measurement device that measures the three-dimensional shape of an object using a DOT pattern projection method. In such a 3D measurement device, luminance information is given in the same way as in the optical cutting method described in the third embodiment above. This allows each dot to be identified individually, although the number that can be identified depends on the resolution of the luminance information. This DOT pattern projection method can reduce the amount of data transfer when compared to the optical cutting method, thus speeding up the function,

PARTIAL REFERENCE SIGNS LIST

10 . . . three-dimensional measurement device
20 . . . projection unit
30 . . . imaging unit
31 . . . Image sensor outputting event data (serving as event camera)
40 . . . Measurement unit (serving as measurement means and control means)
R . . . object being measured

What is claimed is:
1. A three-dimensional measurement device, comprising:
a projection unit which optically projects a predetermined stripe pattern onto an object being measured;
an imaging unit which captures an image by optically imaging the object onto which the predetermined stripe pattern has been projected; and
a measurement unit which measures a three-dimensional shape of the object by applying a phase shift method to luminance information obtained from a captured image optically obtained by the imaging unit,
wherein
the imaging unit is provided with an image sensor, the image sensor outputting event data including data of two-dimensional points whose positions of pixels are specified corresponding to changes of luminescence when receiving the light, and is configured to generate the captured images from the event data outputted by the image sensor;
the image sensor is configured to output the event data showing positive luminance changes when the luminance changes brightly and output the event data showing negative luminance changes when the luminance changes darkly; and
the measurement unit is configured to obtain the luminance information showing the three-dimensional shape of the object, based on a difference, pixel by pixel, between output time of the event data showing the positive luminance changes and output time of the event data showing the negative luminance changes in the captured image.
2. A three-dimensional measurement device, comprising:
a projection unit which optically projects a predetermined stripe pattern onto an object being measured;

an imaging unit which captures an image by optically imaging the object onto which the predetermined stripe pattern has been projected; and a measurement unit which measures a three-dimensional shape of the object by applying a phase shift method to luminance information obtained from a captured image optically obtained by the imaging unit, wherein the imaging unit is provided with an image sensor, the image sensor outputting event data including data of two-dimensional points whose positions of pixels are specified corresponding to changes of luminescence when receiving the light, and is configured to generate the captured images from the event data outputted by the image sensor;

the projection unit is configured to project the predetermined stripe pattern based on short pulses of light emitted a plurality of times within a unit time; and the measurement unit is configured to obtain the luminance information, as information indicating the three-dimensional shape of the object, based on the number of times of output of the event data per unit time, pixel by pixel, in the captured image.

3. A three-dimensional measurement device, wherein the three-dimensional measurement device comprises a projection unit which optically projects a pattern on a light cutting method onto an object being measured;

an imaging unit which captures an image by optically imaging the object onto which the pattern has been projected; and a measurement unit which measures a three-dimensional shape of the object based on a captured image optically obtained by the imaging unit, wherein the projection unit is configured to project the pattern for the light cutting method such that luminescence changes at a certain rate in a first direction and the luminescence does not change in a second direction perpendicular to the first direction;

the imaging unit is provided with an image sensor, the image sensor outputting event data including data of two-dimensional points whose positions of pixels are specified corresponding to changes in the luminescence when receiving the light, and is configured to generate the captured images from the event data outputted by the image sensor, wherein the image sensor outputs the event data showing positive luminance changes when the luminance changes brightly and outputs the event data showing negative luminance changes when the luminance changes darkly; and the measurement unit is configured to obtain the luminance information, based on a difference, pixel by pixel, between output time of the event data showing the positive luminance changes and output time of the event data showing the negative luminance changes in the captured image; and obtain a three-dimensional shape of the object under the light cutting method based on positions and the luminance information of the event data outputted in a same time zone in the captured images.

4. A three-dimensional measurement device according to claim 2, wherein the projection unit is configured to switch between a state in which the projection unit projects the predetermined stripe pattern based on a short pulse emission emitted multiple times within a unit time and a state in which the projection unit projects the predetermined stripe pattern based on a single pulse emitted once within the unit time;

the image sensor is configured to output event data of positive luminance changes in a case of brightening luminance changes and event data of negative luminance changes in a case of darkening luminance changes;

the three-dimensional measurement device comprises a judgment unit that judges whether or not a relative distance change of the object to the image unit is greater than a predetermined distance, based on a difference between a previous measurement result by the measurement unit and a past measurement result;

when the relative distance change is determined by the judgment unit to be less than the predetermined distance, the projection unit projects the predetermined stripe pattern based on the short pulse emission, and the measurement unit obtains the luminance information based on the number of outputs per unit time of the event data in pixel units in the captured image; and when the relative distance change is determined by the judgment unit to be greater than the predetermined distance, the projection unit projects the predetermined stripe pattern based on the single pulse emission, and the measurement unit obtains the luminance information based on the time difference between the output of event data of the positive luminance changes and the output of event data of said negative luminance changes in each pixel in the captured image.

5. A three-dimensional measurement device according to claim 3, wherein the projection unit is configured to switch between a state in which the projection unit projects a pattern for the optical cutting method and a state in which the projection unit projects a predetermined stripe pattern for the phase shift method;

the image sensor is configured to output event data of positive luminance changes in a case of brightening luminance changes and event data of negative luminance changes in a case of darkening luminance changes;

the measurement unit is provided with a judgment unit that judges whether or not a relative distance change of the object to the imaging unit is greater than a predetermined distance based on a difference between previous measurement results by the measurement unit and measurement results earlier than the previous measurement;

when the relative distance change is determined by the determination unit to be greater than the predetermined distance, the projection unit projects the pattern for the optical cutting method, and the measurement unit measures a three-dimensional shape of the object based on a position of the event data outputted during the same time period in a captured image of the object imaged, by the optical cutting method; and when the relative distance change is determined to be less than the predetermined distance by the judgment unit, the projection unit projects the predetermined stripe pattern for the phase shift method, and the measurement unit measures a three-dimensional shape of the object by the phase shift method, based on luminance information obtained based on a time difference between output of the event data of the positive luminance changes and output of the event data of the negative luminance changes in each pixel in the captured image.

<p style="text-align:center">* * * * *</p>